United States Patent [19]
Bealkowski

[11] Patent Number: 5,873,129
[45] Date of Patent: Feb. 16, 1999

[54] METHOD AND APPARATUS FOR EXTENDING PHYSICAL SYSTEM ADDRESSABLE MEMORY

[75] Inventor: Richard Bealkowski, Delray Beach, Fla.

[73] Assignee: International Business Machines Corporation, Armonk, N.Y.

[21] Appl. No.: 203,729

[22] Filed: Feb. 28, 1994

Related U.S. Application Data

[63] Continuation of Ser. No. 705,277, May 24, 1991, abandoned.

[51] Int. Cl.$^6$ .................................................. G06F 12/10
[52] U.S. Cl. ................................................................ 711/207
[58] Field of Search ............................. 395/425; 711/207

[56] References Cited

U.S. PATENT DOCUMENTS

| | | | |
|---|---|---|---|
| 4,403,288 | 9/1983 | Christian et al. | 364/200 |
| 4,791,564 | 12/1988 | Takai | 364/200 |
| 4,843,542 | 6/1989 | Dashiell et al. | 395/425 |
| 4,868,734 | 9/1989 | Idleman et al. | 364/200 |
| 4,896,262 | 1/1990 | Wayama et al. | 364/200 |
| 5,012,407 | 4/1991 | Finn | 364/DIG. 1 |
| 5,063,499 | 11/1991 | Garber | 364/DIG. 1 |

OTHER PUBLICATIONS

Jonathan Perrow, "Virtual Memory End RAM Jam", MacWeek Magazine, vol. 3, No. 2, Jan. 10, 1989, pp. 1, 8.
Robert L. Hummel, "Connectrix's Virtual Memory Solution", Macintosh News, Jun. 5, 1989, p. 8.
Herb Bethoney, "Virtual 2.0 Beats Mac's 8M–Byte RAM Barrier", PC Week Magazine, Oct. 23, 1989, pp. 15, 18.
Jonathan Perrow, "Virtual Memory Draws Nearer", MacWeek Magazine, Jan. 31, 1989, pp. 1, 9.
Editorial, "'89 Won't be Apple's Year of Multitasking", MacWeek Magazine, Jan. 3, 1989, p. 22.
Hamacher, et al., *Computer Organization*, 2nd Ed., 1984, pp. 214–216 & 313–317.

*Primary Examiner*—David L. Robertson
*Attorney, Agent, or Firm*—Michael J. Buchenhorner

[57] ABSTRACT

The extension of the physical addressable memory space of a computer system is achieved by a secondary storage subsystem controller which intercepts requests to non-existent physical random access memory. The requests are translated into requests for data stored within a lower-cost secondary storage subsystem. The processor accesses data and programs on the secondary storage subsystem in the same manner as data and programs are accessed in system memory. The secondary storage subsystem can simultaneously function as a conventional storage medium.

20 Claims, 4 Drawing Sheets

METHOD AND APPARATUS FOR EXTENDING PHYSICAL SYSTEM ADDRESSABLE MEMORY

This is a continuation of application Ser. No. 07/705,277 filed on May 24, 1991, now abandoned.

BACKGROUND OF THE INVENTION

1. Field of the Invention

This invention relates to personal computer systems and in particular to a method and apparatus for extending the system addressable physical memory space in a manner transparent to users of the address space.

2. Description of the Related Art

Personal computer systems in general, and IBM™ personal computers in particular, have attained widespread use for providing computer power to many segments of today's society. Personal computer systems can usually be defined as a desk top, floor standing, or portable computer that consists of a system unit having a system processor, a display monitor, a keyboard, one or more diskette drives, a fixed disk storage, and an optional printer. These systems are designed primarily to give independent computing power to a single user or small group of users and are inexpensively priced for purchase by individuals or businesses. Examples of such personal computer systems are IBM's PERSONAL COMPUTER, PERSONAL COMPUTER XT™, PERSONAL COMPUTER AT™ and IBM's PERSONAL SYSTEM/2™ (hereinafter referred to as the IBM PC, XT™, AT™, and PS/2™ respectively) Models 25, 30, 50, 60, 70, 80, 90, and 95.

These systems can be classified into two general families. The first family, usually referred to as Family 1 Models, use a bus architecture exemplified by the IBM AT computer and other "IBM compatible" machines. The second family, referred to as Family 2 Models, use IBM's Micro Channel™ bus architecture exemplified by IBM's PS/2 Models 50 through 95. The bus architectures used in Family 1 and Family 2 are well known in the art.

Beginning with the earliest personal computer system of Family 1 models, the IBM PC, and through the Family 2 models the central processing unit was chosen from the Intel™ "86 Family" of processors. The Intel 86 Family of processors includes the 8088, 8086, 80286, 80386, and 80486 processors commercially available from Intel Corporation. The architecture of the Intel 86 Family of processors provides an upwardly compatible instruction set which assists in preserving software investments from previous processors in the 86 family. This upward compatibility of processors which preserves the software application base is one of the major factors which contributed to the enormous success of the IBM PC and subsequent models.

The IBM PC and XT were the first models of the IBM personal computer line and used the Intel 8088 processor. The next significant change to IBM personal computer systems was the IBM AT which used the Intel 80286 processor. The PS/2 line spanned several of the Intel processors. A system similar to the PC and XT was a version of the PS/2 Model 30 which used an Intel 8086. The PS/2 Models 50 and 60 both used the Intel 80286 processor. The Intel 80386 processor is used in the IBM PS/2 Model 80 and certain versions of the IBM PS/2 Model 70. Other versions of the IBM PS/2 Model 70, as well as the PS/2 Models 90 XP 486 and 95 XP 486, use the Intel 80486 processor. One of the common points in all these systems is the use of an Intel 86 family processor. A variety of commonly available and well known software operating systems, such as DOS or OS/2, can operate on various members of the Intel family of processors.

The processors in the Intel 86 family support a variety of "modes". The basic mode in the Intel 86 family is "Real" mode. Real mode is the only operating mode of the 8088 and 8086. Real mode supports a one megabyte address space. There are no protection mechanisms available in the 8088 and 8086 processors. The 80286 supports both a Real and "Protected" mode of operation. As the name "Protected" implies, Protected mode provides a protected mode of operation. This protection prevents an application from interfering with the operation of other applications or the operating system. The 80286 provides extended addressing capabilities over the 8088 and 8086 by allowing up to 16 megabytes to be directly addressed. To maintain downward compatibility the 80286 can be operated in Real mode to emulate the Real mode of the 8088 or 8086. The 80386 and 80486 extend the Intel 86 family architecture even further by providing the ability to address up to four gigabytes of physical memory. The 80386 and 80486 also support a "Virtual 86" mode of operation. The Virtual 86 mode supports the operational characteristics of the Real mode within the overall confines of the protected mode environment. This Virtual 86 mode is useful for providing a very high level of compatibility with applications which run under the DOS operating system but must now operate within an overall protected mode operating system.

By utilizing 32 address lines the 80386 and 80486 can achieve a total physical addressability of $2^{32}$ bytes which is 4,294,967,296 bytes. Currently providing that much physical random access memory on a single computer system is impractical. However, it has become practical to provide that much storage space on devices such as disks.

A hierarchy of storage exists in a computer system. As an example, the storage hierarchy arranged in order of speed can include:

1. processor registers (fastest)
2. cache memory
3. system random access memory
4. disk
5. tape (slowest)

In general, the cost per unit storage is more for the faster storage than it is for the slower storage.

The processor registers and cache tend to be small in size. System random access memory (RAM) is typically much larger and is used to store programs and data during program execution. Disk and tape storage devices have very large capacity, but data and programs on these devices must be moved into RAM before the system can use them. Increasing the amount of RAM would expand the capabilities of a computer system by allowing much larger programs and data sets to be stored where they can be accessed much faster than data or programs on disk or tape. However, RAM is a finite resource within any computer system which typically has a much higher cost per unit storage than disk or tape. Therefore, it would be desirable to increase the apparent amount of RAM without increasing the actual amount of RAM.

SUMMARY OF THE INVENTION

The extension of physical system addressable memory to allow the processor to use addresses beyond the range available to physical RAM in a given system is achieved by controlling emulated RAM from the disk adapter card. The disk adapter card monitors the address bus. When a request for RAM outside of the range of actual RAM addresses is detected the adapter uses a combination of onboard cache buffer storage and secondary storage to extend the physical addressable memory space of the computer system by translating that request into a request within a lower-cost secondary storage subsystem. Emulation of RAM by the adapter card is accomplished in parallel with normal processing of read and write requests to secondary storage.

DESCRIPTION OF THE PREFERRED EMBODIMENT

Figure 1:
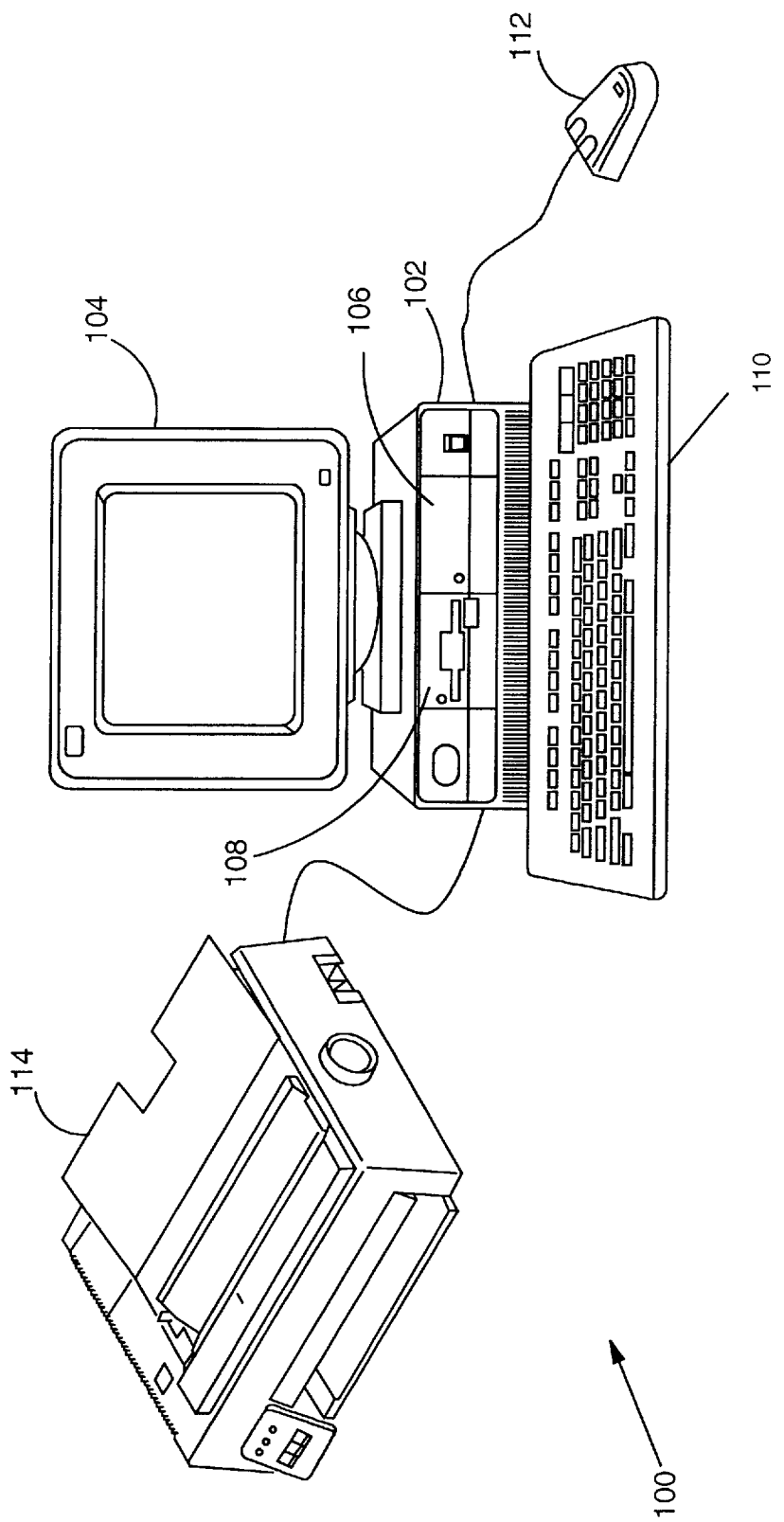
FIG. 1 is a drawing of a computer system.

Referring now to the drawings, and in particular to FIG. 1, there is shown a personal computer system 100 in which the present invention can be employed. As shown, the personal computer system 100 comprises a number of components which are interconnected together. More particularly, a system unit 102 is coupled to and can drive an optional monitor 104 (such as a conventional video display). A system unit 102 can also be optionally coupled to input devices such as a keyboard 110 or a mouse 112. An optional output device such as a printer 114 can also be connected to the system unit 102. Finally the system unit 102 may include one or more mass storage devices such as the diskette drive 108 and the hard disk drive 106.

As will be described below, the system unit 102 responds to input devices such as the keyboard 110, the mouse 112, or local area network communication system (not shown). Additionally, input/output devices, such as the diskette drive 108, hard disk drive 106, display 104, printer 114, and local area network communication system are connected to the system unit 102 in a manner well known. Of course, those skilled in the art are aware that other conventional components can also be connected to the system unit 102 for interaction therewith. In accordance with the present invention, the personal computer system 100 includes a processor 202 (shown in FIG. 2) that is interconnected to a dynamic random access memory (referred to interchangeably in this description as DRAM or RAM) 264 (shown in FIG. 2), a read only memory (ROM) 242 (shown in FIG. 2), and a plurality of I/O devices 104, 106, 108, 110, 112, 114.

In normal use, the personal computer system 100 can be designed to give independent computing power to a small group of users as a server or a single user and is inexpensively priced for purchase by individuals or small businesses. In operation, the processor 202 functions under an operating system such as IBM's OS/2 operating system or DOS. This type of operating system includes a BIOS interface between the I/O devices and the operating system. BIOS is more clearly defined in the *IBM Personal System/2 and Personal Computer BIOS Interface Technical Reference*, 1988, which is incorporated by reference herein. BIOS, which can be initially stored in a ROM on a motherboard or planar, includes diagnostic routines which are contained in a power on self test section referred to as POST.

Figure 2:
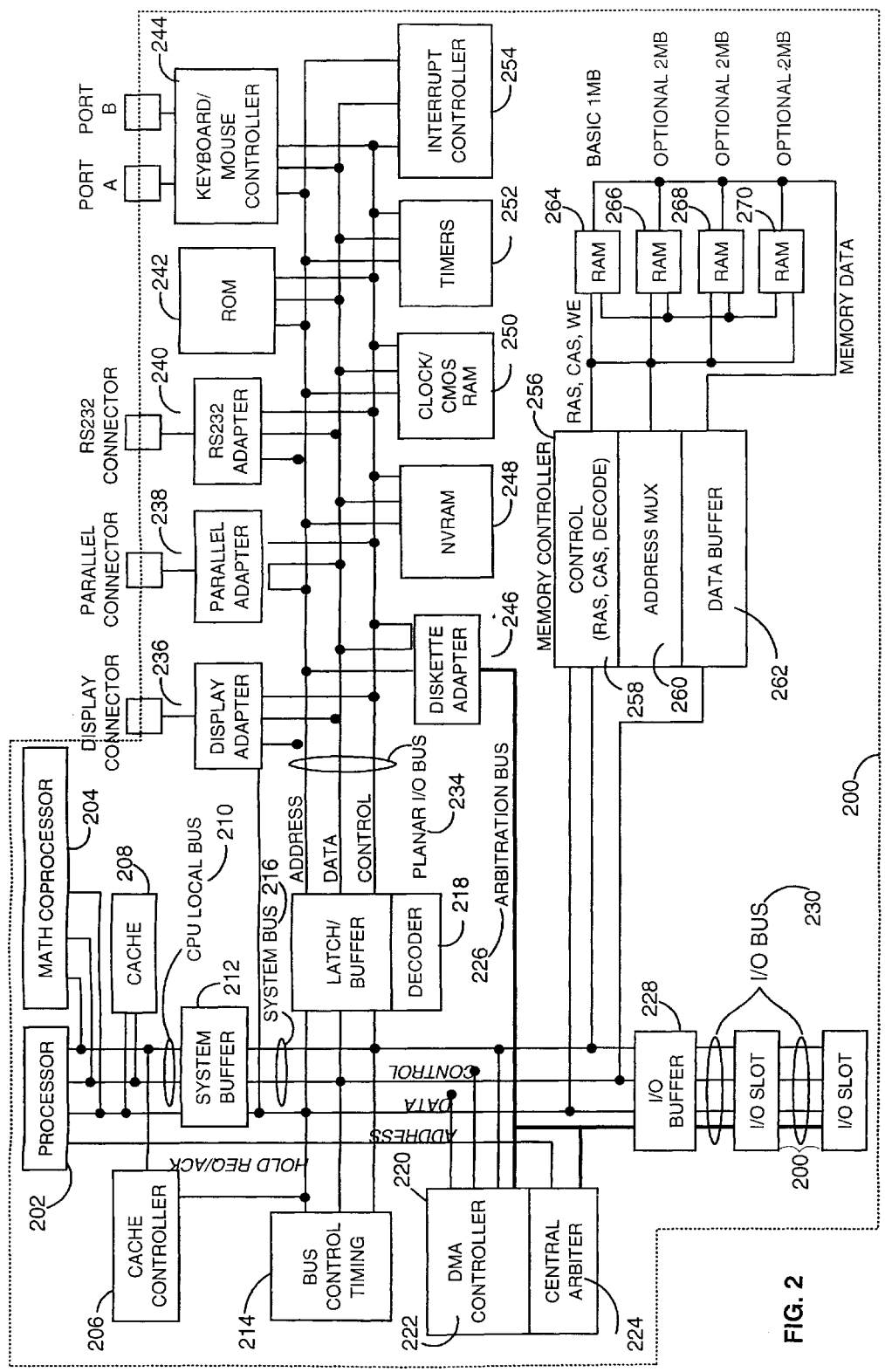
FIG. 2 is a block diagram of a planar board which can be used in the computer system of FIG. 1.

Referring to FIG. 2, there is shown a block diagram of the planar 200 in system unit 102 illustrating the various components of the planar 200 in accordance with the present invention. FIG. 2 further illustrates the connection of the planar 200 to the I/O slots 232 and other hardware of the personal computer system 100. Connected to the planar 200 is the processor 202 which is connected by a high speed CPU local bus 210 under control of a bus controlled timing unit 214 to a memory control unit 256 which is further connected to a volatile random access memory (RAM) 264. While any appropriate processor 202 can be used, one suitable processor is the Intel 80386.

The CPU local bus 210 (comprising data, address and control components) provides for the connection of a processor 202, an optional math coprocessor 204, a cache controller 206, and a cache memory 208. Also coupled on the CPU local bus 210 is a system buffer 212. The system buffer 212 is itself connected to a slower speed (compared to the CPU local bus) system bus 216, also comprising address, data and control components. The system bus 216 extends between the system buffer 212 and an I/O buffer 228. The system bus 216 is further connected to a bus control and timing unit 214 and a DMA unit 220. The DMA unit 220 is comprised of a central arbitration unit 224 and a DMA controller 222. The I/O buffer 228 provides an interface between the system bus 216 and an I/O bus 230. Those skilled in the art will recognize that while the preferred embodiment is implemented on the Micro Channel bus of the IBM PS/2, which is well known in the art, alternative bus architectures could also be used to implement this invention.

Connected to the I/O bus 230 are a plurality of I/O slots 232 for receiving adapter cards (not shown) which may be further connected to an I/O device or memory. Two I/O slots 232 are shown for convenience, but additional I/O slots may easily be added to suit the needs of a particular system. An arbitration control bus 226 couples the DMA controller 222 and central arbitration unit 224 to the I/O slots 232 and diskette adapter 246. Also connected to system bus 216 is a memory control unit 256 which is comprised of a memory controller 258, an address multiplexer 260, and a data buffer 262. The memory control unit 256 is further connected to a random access memory as represented by the RAM module 264. The memory controller 258 includes the logic for mapping addresses to and from the processor 202 to particular areas of RAM 264. While the Personal Computer System 100 is shown with a basic 1 megabyte RAM module 264, it is understood that additional memory can be interconnected as represented in FIG. 2 by the optional memory modules 266 through 270.

A latch buffer 218 is coupled between the system bus 216 and a planar I/O bus 234. The planar I/O bus 234 includes address, data, and control components respectively. Coupled along the planar I/O bus 234 are a variety of I/O adapters and other peripheral components such as the display adapter 236 (which is used to drive an optional display 104), a clock 250, nonvolatile RAM 248 (hereinafter referred to as NVRAM), an RS232 adapter 240, a parallel adapter 238, a plurality of timers 252, a diskette adapter 246, a PC keyboard/mouse controller 244, and a read only memory (ROM) 242. The ROM 242 includes the BIOS which further includes POST which is used to test the major components of the personal computer system 100.

The clock 250 is used for time of day calculations. NVRAM 248 is used to store system configuration data. That is, the NVRAM 248 will contain values which describe the present configuration of the system. For example, NVRAM 248 contains information which describe the capacity of a fixed disk or diskette, the type of display, the amount of memory, etc. Furthermore, these data are stored in NVRAM 248 whenever a special configuration program is executed. The purpose of the configuration program is to store values characterizing the configuration of this system to NVRAM 248 which are saved when power is removed from the system.

Connected to keyboard/mouse controller 244 are ports A and B. These ports are used to connect a PC keyboard 110 and mouse 112 to the personal computer system 100. Coupled to RS232 adapter unit 240 is an RS232 connector. An optional device such as a modem (not shown) can be coupled to the system through this connector.

Figure 3:
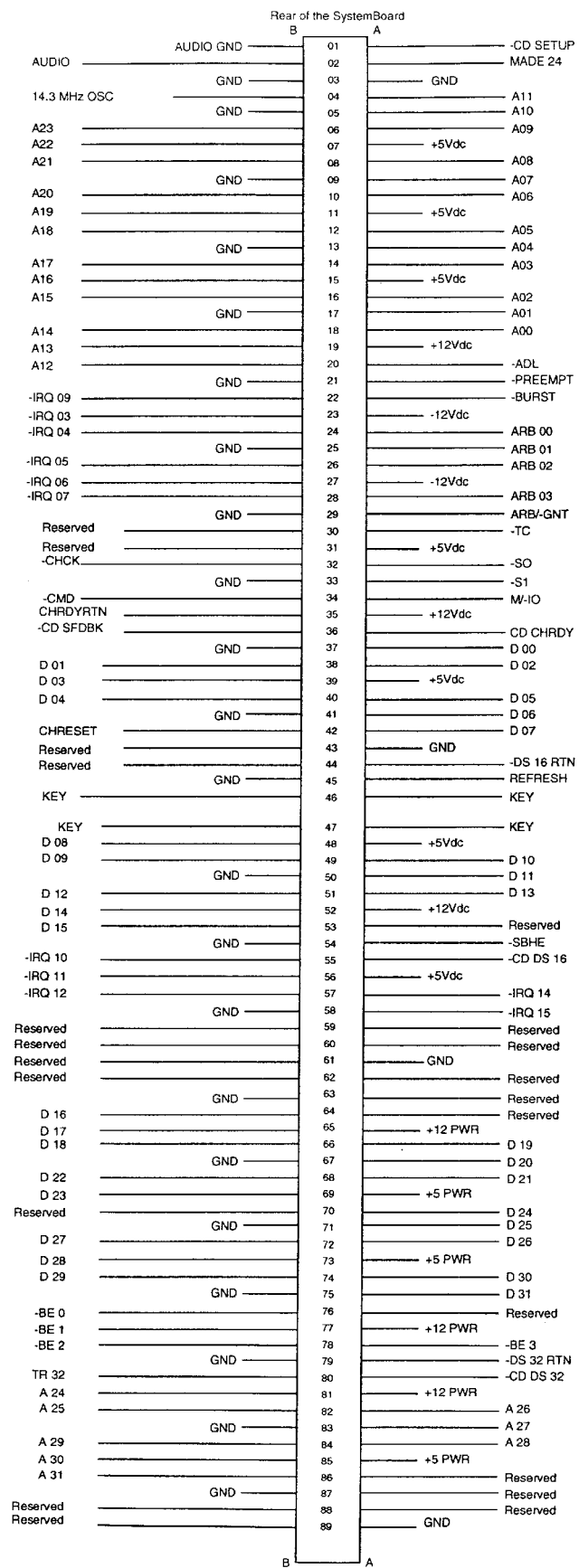
FIG. 3 is a diagram of the 32-bit bus signals including the 32 address lines.

Referring now to FIG. 3, the address lines provided on the I/O bus 230 are shown. The lines specified by: 18A, 17A, 16A, 14A, 13A, 12A, 10A, 9A, 8A, 6A, 5A, 4A, 20B, 19B, 18B, 16B, 15B, 14B, 12B, 11B, 10B, 8B, 7B, 6B, 81B, 82B, 82A, 83A, 84A, 84B, 85B, 86B of the drawing correspond to address lines 0 through 31, respectively. An adapter which connects to all these address lines has the ability to identify the full physical address range of the system.

Figure 4:
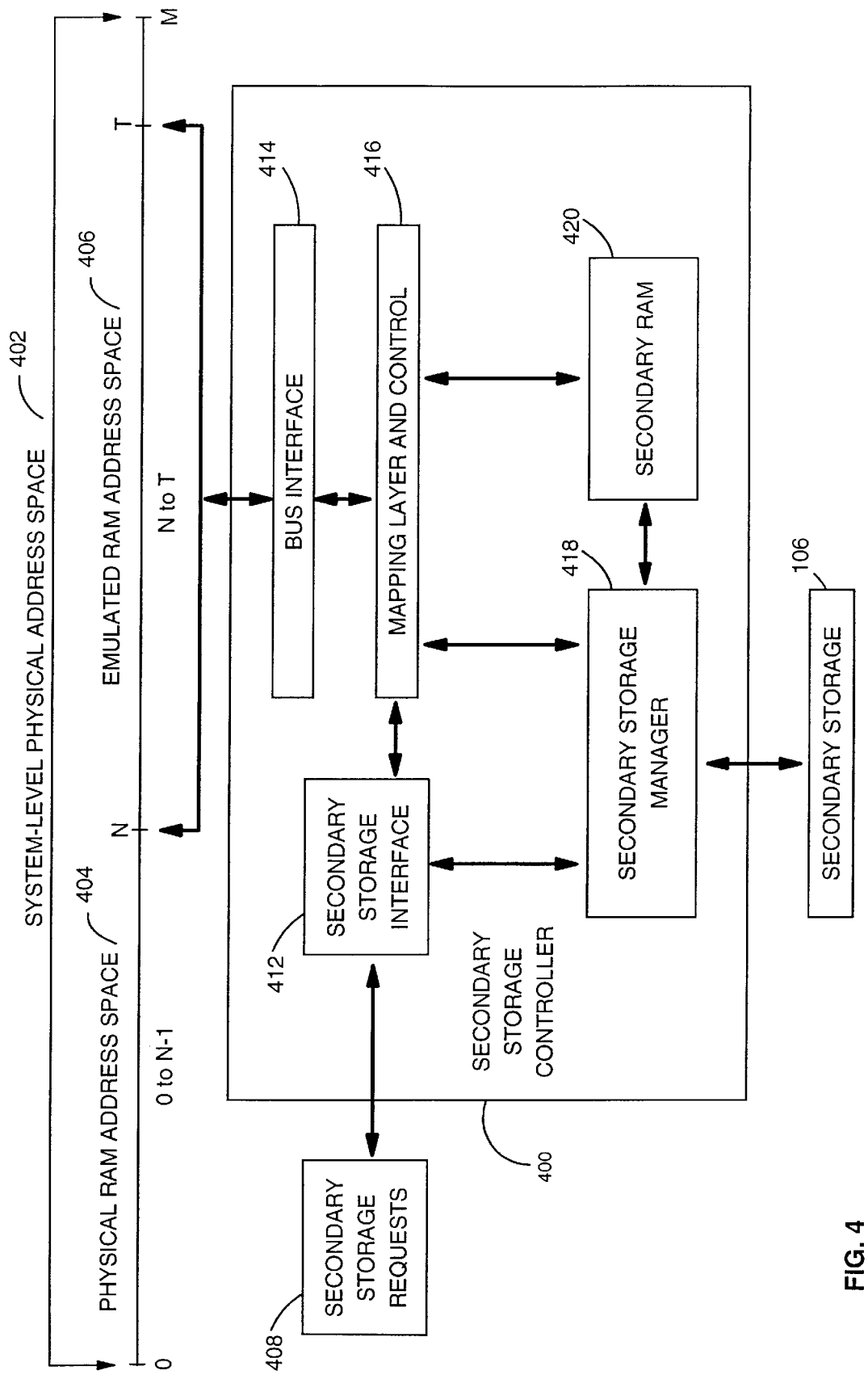
FIG. 4 is a diagram of the secondary storage subsystem used to extend the random access memory space.

While the present invention is described hereinafter with particular reference to FIG. 4, it is to be understood at the outset of the description which follows, it is contemplated that the apparatus and methods in accordance with the present invention may be used with a variety of systems in which an extended memory address space is desirable, which may include other hardware configurations of the planar board. For example, the system processor could be an Intel 80286 or 80486 processor.

To extend the apparent amount of system RAM 264, the role of a secondary storage controller 400 such as a disk drive controller will be enhanced to include a form of system RAM emulation. This mechanism will expand the apparent amount of RAM 264 available in the system using the lower cost-per-byte secondary medium, such as disk, for storage.

System-level physical address space (hereinafter also referred to as memory map 402) 402 is shown in its relation to the secondary storage subsystem which comprises the secondary storage controller 400 and secondary storage 106. The memory map 402 shows a total defined memory address space (i.e., the total space which could be addressed by the processor) composed of a section of physical RAM address space 404 (address range 0 through N−1 which is the address space accessible by the processor 202) along with a supplemental section of emulated RAM address space 406 (address range N through T which is the address space accessible by the secondary storage controller 400) and any remaining space from T+1 up through and including M. Physical RAM address space 404 will generally be equal to the amount of space in RAM 264 and optional RAM 266–270 if present. Note that it would be desirable to define T equal to M since this maximizes the amount of physical space supported. The secondary storage controller 400 can be implemented as an adapter card which connects to the I/O bus 230 through an I/O slot 232 connector. Those skilled in the art will recognize that while the I/O bus 230 is used to facilitate the invention, alternative bus structures could also be used.

The secondary storage controller 400 responds via the Bus Interface 414 to memory address references in the range defined for emulated RAM address space 406. The use of bus interfaces for addressing, control, and movement of data are well known in the art. The emulated RAM address space 406 is not composed entirely of the semiconductor RAM and can reside entirely on secondary storage. Those skilled in the art will recognize that while the invention can be implemented at low cost without secondary RAM 420, the addition of secondary RAM 420 to the secondary storage controller 400 will improve performance of the system. The actual storage of the data will be both in secondary RAM 420 (which is a physical cache storage) and on secondary storage 106 (the hard disk shown in FIG. 1) rather than in a system RAM 264. The secondary storage controller 400 uses secondary RAM 420 as intermediate storage to buffer the secondary storage 106 operations. A memory read or write detected by the bus interface 414 to be within the emulated space 406 is serviced by the secondary storage controller 400.

The mapping layer and control 416 determines if the requested data is currently loaded into the controller's secondary RAM 420 or if it must be loaded from the secondary storage 106. If the requested data is already loaded within the secondary storage controller 400 then it is retrieved from secondary RAM 420 and made available. If, however, the data is not preloaded then a request must be made to the secondary storage manager 418 for the referenced data. Since the secondary storage manager 418 works with blocks of data the request must be converted to a request for a complete block. If the mapping layer and control 416 does not locate enough available space in the secondary RAM 420 then it must first write out a block or blocks through the secondary storage manager 418 to secondary storage 106 thus freeing up space before new blocks can be loaded. The mapping layer and control 416 can be implemented using any number of available caching mechanisms which are well known in the art.

The secondary storage controller 400 continues to act as a traditional secondary storage controller with its associated secondary storage interface 412 in that it accepts secondary storage requests 408. These requests can be the usual disk read or write requests associated with the operation of a file system. The secondary storage requests 408 are received from the I/O bus 230. For ease of illustration, the connection to the I/O bus 230 is not shown since they are well known in the art. These operations are referred to as I/O read/writes to distinguish them from read/writes pertaining to the emulated RAM address space 406. The secondary storage interface 412 controls I/O read/writes through the secondary storage manager 418 under control of the mapping layer and control 416 section of the secondary storage controller 400. The mapping layer and control 416 determines priority of access to the secondary storage 106 when requests are simultaneously pending on the bus interface 414 and the secondary storage interface 412. For example, in a multiprocessor system, one processor could be attempting an I/O read or write while another processor could be attempting to access emulated RAM address space 406. The secondary storage manager 418 is responsible for controlling data movement to and from the secondary storage 106.

With proper buffering the actual amount of disk accesses can be reduced due to locality of reference (the idea that accesses to memory are often clustered around a small area). Although slower than an approach which utilizes only semiconductor RAM 264 to populate the system-level physical address space 402, emulation can be ideal for storage needs such as large, relatively infrequently used data structures or clustered references. A processor 202 uses program code and data from the emulated RAM address space 406 through memory reads and memory writes in the same way it uses program code and data from system RAM 264. Once code or data is in a processor cache 208 there will be no further performance impact for those particular references.

In a uni-processor system the benefits of the extended address space are tempered by the occasional slower access and hence inevitable performance decrease. In a multiprocessor system, however, the performance concern is reduced. In a multiprocessor system when one of the processors is experiencing a memory access delay due to the nature of the emulated address space the other processors can still be operating at full speed. The system throughput of a multiprocessor system is the collection of work performed by all the processors in the system. Thus apparent delays to the user can be minimized.

In addition, an application program which would require large amounts of system-level address space 402, and which also is an application which is run in "batch" (i.e. unattended by a user) mode would have all of the benefits associated with increased storage space with no apparent performance penalty caused by accesses to secondary storage 106.

Since the emulated RAM address space 406 is supported by nonvolatile secondary storage 106, the emulated RAM address space 406 has an advantage over the volatile system RAM 264. In the event of a power failure or other system interruption the code and data in standard system RAM 264 will be lost. The code and data stored on secondary storage 106 as part of the emulated RAM address space 406 will be preserved. The extension of the address space and the nonvolatile nature of the emulated space provide significant enhancements to the computer system 100.

Those skilled in the art will recognize that while the ability of the secondary storage controller 400 to control the secondary storage 106 as both a conventional storage device and as storage for emulated RAM 406 provides a convenient and flexible use of secondary storage 106, the secondary storage controller 400 could also be dedicated to the emulated RAM function with the elimination of the circuitry necessary to process normal storage access requests. This would provide a lower cost secondary storage controller card and improve performance of the emulated RAM function through dedicated hardware.

While the present invention was described above, it will be understood by those skilled in the art that various changes in detail may be made without departing from the spirit, scope, and teaching of the invention. For example, while the preferred embodiment used Intel processors and an IBM PS/2 Micro Channel bus for illustrative purposes, this invention could be implemented on other processors and/or bus types. The secondary storage controller is shown in the preferred embodiment as an adapter card, but could easily be incorporated into the planar. A read/write optical storage device could replace the hard disk used as secondary storage. Likewise, those skilled in the art will recognize that many elements of the invention can be implemented in hardware or software. Accordingly, the invention should be limited only as specified by the claims.

I claim:

1. An apparatus for extending the address range of system RAM beyond the range of physical RAM, comprising:
   a central processor, physical RAM having a fixed address range, and a bus for coupling the central processor to the physical RAM;
   secondary storage coupled to the bus;
   address decoder means for determining whether a read/write request for RAM is beyond the fixed address range of the physical RAM; and
   a secondary storage controller circuit, coupled to the bus, comprising:
      a secondary storage manager to read/write emulated RAM on the secondary storage; and
      control means to determine the location of emulated RAM on the secondary storage and control reading and writing of emulated RAM by the secondary storage manager;
   whereby RAM storage addresses beyond the fixed address range of physical RAM addresses can be used by the processor, thereby extending the address range of the physical RAM.

2. An apparatus, as in claim 1, wherein said secondary storage controller further comprises:
   means to receive and control I/O read/write requests to secondary storage; and
   means to prioritize requests to secondary storage when simultaneous requests for I/O read/writes and for emulated RAM are received.

3. An apparatus, as in claim 1, wherein said secondary storage controller further comprises means to cache emulated RAM read/write requests to secondary storage.

4. An apparatus, as in claim 3, wherein said secondary storage controller further comprises:
   means to receive and control I/O read/write requests to secondary storage; and
   means to prioritize requests to secondary storage when simultaneous requests for I/O read/write operations and for emulated RAM accesses are received.

5. An apparatus for extending the address range of RAM beyond the fixed address range of physical RAM, comprising:
   a processor, physical RAM having a fixed address range, and a bus;
   secondary storage; and
   a secondary storage controller, said secondary storage controller further comprising:
      a bus interface connected to the bus to detect read/write requests for emulated RAM from the processor;
      a secondary storage manager to read/write emulated RAM on the secondary storage; and
      a mapping layer and control circuit connected to the bus interface to receive emulated RAM read/write requests detected by the bus interface and output to the mapping layer and control circuit, said mapping layer and control circuit further connected to the secondary storage manager to determine the location of emulated RAM on the secondary storage and control reading and writing of emulated RAM by the secondary storage manager;
   whereby RAM storage addresses beyond the address range of physical RAM addresses can be used by the processor thereby extending the address range of RAM.

6. An apparatus, as in claim 5, wherein said secondary storage controller further comprises a secondary storage interface connected to the bus to receive I/O read/write requests to secondary storage, said secondary storage interface further connected to the secondary storage manager to control I/O read/write operations to the secondary storage, and also connected to and controlled by the mapping layer and control circuit to prioritize requests to the secondary storage when simultaneous I/O read/write requests and emulated RAM requests are received.

7. An apparatus, as in claim 5, wherein said secondary storage controller further comprises a secondary physical RAM connected to the mapping layer and control circuit and also connected to the secondary storage manager to cache emulated RAM read/write requests to the secondary storage.

8. An apparatus, as in claim 6, wherein said secondary storage controller further comprises a secondary storage interface connected to the bus to receive I/O read/write requests to the secondary storage, said secondary storage interface further connected to the secondary storage manager to control I/O read/write operations to the secondary storage, and also connected to and controlled by the mapping layer and control circuit to prioritize requests to the secondary storage when simultaneous I/O read/write requests and emulated RAM requests are received.

9. A secondary storage controller to emulate RAM for extending the address range of RAM in a computer system having a processor, a bus, physical RAM having a fixed address range, and secondary storage, beyond the range of the physical RAM, comprising:

means to detect read/write requests for emulated RAM from the processor;

read/write means to read/write emulated RAM on the secondary storage; and control means to determine the location of emulated RAM on the secondary storage and control reading and writing of emulated RAM by the secondary storage manager;

whereby RAM storage addresses beyond the address range of physical RAM addresses can be used by the processor thereby extending the address range of RAM.

10. A secondary storage controller, as in claim 9, wherein said secondary storage controller further comprises:

means to receive and control I/O read/write requests to the secondary storage; and means to prioritize requests to the secondary storage when simultaneous I/O read/write requests and requests for emulated RAM are received.

11. A secondary storage controller, as in claim 9, wherein said secondary storage controller further comprises means to cache emulated RAM read/write requests to the secondary storage.

12. A secondary storage controller, as in claim 11, wherein said secondary storage controller further comprises:

means to receive and control I/O read/write requests to the secondary storage; and means to prioritize requests to the secondary storage when simultaneous I/O Read/write requests and requests for emulated RAM are received.

13. A secondary storage controller to emulate RAM for extending the address range of RAM in a computer system having a processor, a bus, physical RAM having a fixed address range, and secondary storage having an address range beyond the range of the physical RAM, said secondary storage controller comprising:

a bus interface connected to the bus to detect read/write requests for emulated RAM from the processor;

a secondary storage manager to read/write emulated RAM on the secondary storage; and a mapping layer and control circuit connected to the bus interface to receive emulated RAM read/write requests detected by the bus interface and output to the mapping layer and control circuit, said mapping layer and control circuit further connected to the secondary storage manager to determine the location of emulated RAM on the secondary storage and control reading and writing of emulated RAM by the secondary storage manager;

whereby RAM storage addresses beyond the address range of physical RAM addresses can be used by the processor thereby extending the range of RAM.

14. A secondary storage controller, as in claim 13, wherein said secondary storage controller further comprises a secondary storage interface connected to the bus to receive I/O read/write requests to secondary storage, said secondary storage interface further connected to the secondary storage manager to control I/O read/write operations to the secondary storage, and also connected to and controlled by the mapping layer and control circuit to prioritize requests to secondary storage when simultaneous requests for I/O read/write requests and emulated RAM requests are received.

15. A secondary storage controller, as in claim 13, wherein said secondary storage controller further comprises a physical RAM connected to the mapping layer and control circuit and also connected to the secondary storage manager to cache emulated RAM read/write requests to secondary storage.

16. A secondary storage controller, as in claim 15, wherein said secondary storage controller further comprises a secondary storage interface connected to the bus to receive I/O read/write requests to the secondary storage, said secondary storage interface further connected to the secondary storage manager to control I/O read/write operations to the secondary storage, and also connected to and controlled by the mapping layer and control circuit to prioritize requests to the secondary storage when simultaneous requests for I/O read/write requests and emulated RAM requests are received.

17. A method for extending the address range of RAM beyond the range of physical RAM in a computer system having a processor, the physical RAM having a fixed address range, a secondary storage controller and secondary storage, including the secondary storage controller steps of:

detecting read/write requests for emulated RAM from the processor;

determining the location of emulated RAM on the secondary storage; and reading and writing emulated RAM on the secondary storage;

whereby RAM storage addresses beyond the address range of physical RAM addresses can be used by the processor thereby extending the range of RAM.

18. A method, as in claim 17, including the further steps of:

receiving I/O read/write requests to the secondary storage;

controlling I/O read/write requests to the secondary storage; and prioritizing requests to secondary storage when simultaneous I/O read/write requests and requests for emulated RAM are received.

19. A method, as in claim 17, including the further step of caching emulated RAM read/write requests to the secondary storage.

20. A method, as in claim 19, including the further steps of:

receiving I/O read/write requests to the secondary storage;

controlling I/O read/write requests to the secondary storage; and prioritizing requests to the secondary storage when simultaneous I/O read/write requests and requests for emulated RAM are received.

* * * * *